United States Patent
Mason et al.

(10) Patent No.: US 10,415,393 B2
(45) Date of Patent: Sep. 17, 2019

(54) MANUFACTURING METHOD

(71) Applicant: ROLLS-ROYCE PLC, London (GB)

(72) Inventors: John Mason, Barnoldswick (GB); Keith Whittingham, Barnoldswick (GB)

(73) Assignee: ROLLS-ROYCE plc, London (GB)

(*) Notice: Subject to any disclaimer, the term of this patent is extended or adjusted under 35 U.S.C. 154(b) by 943 days.

(21) Appl. No.: 14/926,638

(22) Filed: Oct. 29, 2015

(65) Prior Publication Data

US 2016/0123155 A1 May 5, 2016

(30) Foreign Application Priority Data

Nov. 5, 2014 (GB) .................................. 1419681.0

(51) Int. Cl.
*F01D 5/14* (2006.01)
*B29C 49/64* (2006.01)
(Continued)

(52) U.S. Cl.
CPC ........... *F01D 5/147* (2013.01); *B21D 26/055* (2013.01); *B21D 26/059* (2013.01); *B21D 53/78* (2013.01);
(Continued)

(58) Field of Classification Search
CPC .. F01D 5/147; F05D 2220/32; F05D 2220/36; F05D 2230/23; F05D 2230/25; F05D 2230/60; F05D 2240/301
(Continued)

(56) References Cited

U.S. PATENT DOCUMENTS 5,469,618 A * 11/1995 LeMonds ............. B21D 26/055
29/463
5,581,882 A * 12/1996 Fowler ................... B23K 20/18
228/118
(Continued)

FOREIGN PATENT DOCUMENTS

EP 0541207 A1 5/1993
EP 2 929 955 A1 10/2015
(Continued)

OTHER PUBLICATIONS

Mar. 8, 2016 Extended Search Report issued in European Application No. 15188765.0.
(Continued)

*Primary Examiner* — Carlos A Rivera
*Assistant Examiner* — Jason Mikus
(74) *Attorney, Agent, or Firm* — Oliff PLC

(57) ABSTRACT

A method of manufacturing an aerofoil blade includes the steps of providing: an aerofoil sub-assembly having a pair of aerofoil skins, wherein at least one of the skins is formed to have on its outer face an outer primary relief feature formed proud of the adjacent region of the outer face and an outer secondary relief feature projecting from the outer primary relief feature; arranging the aerofoil sub-assembly in a cavity die mould; and performing a hot forming process to form an internal cavity between the respective aerofoil skins by inflating the sub-assembly to conform the outer faces of the respective skins to the cavity die mould, whereby in conforming the respective outer faces of the skins to the cavity die mould, the outer primary and secondary relief features are transferred to the inner face of the respective skin to form respectively inner primary and secondary relief features.

17 Claims, 6 Drawing Sheets

(51) Int. Cl.
| | |
|---|---|
| *F01D 5/18* | (2006.01) |
| *B21D 26/055* | (2011.01) |
| *B21D 26/059* | (2011.01) |
| *B21D 53/78* | (2006.01) |
| *B29C 49/02* | (2006.01) |
| *B29C 49/22* | (2006.01) |
| *B29K 105/00* | (2006.01) |
| *B29L 31/08* | (2006.01) |

(52) U.S. Cl.
CPC .............. *B29C 49/02* (2013.01); *B29C 49/22* (2013.01); *B29C 49/64* (2013.01); *F01D 5/18* (2013.01); *B29C 2049/021* (2013.01); *B29K 2105/253* (2013.01); *B29L 2031/082* (2013.01); *F05D 2220/32* (2013.01); *F05D 2220/36* (2013.01); *F05D 2230/23* (2013.01); *F05D 2230/25* (2013.01); *F05D 2230/60* (2013.01); *F05D 2240/301* (2013.01)

(58) Field of Classification Search
USPC ........................................................ 416/233
See application file for complete search history.

(56) References Cited

U.S. PATENT DOCUMENTS

| | | | |
|---|---|---|---|
| 5,890,285 A * | 4/1999 | Pruitt .................. | B21D 26/055 |
| | | | 29/889.72 |
| 2010/0092300 A1 | 4/2010 | Jensen et al. | |
| 2011/0293433 A1 | 12/2011 | Westergaard | |
| 2013/0280059 A1 | 10/2013 | Dolansky et al. | |

FOREIGN PATENT DOCUMENTS

| | | |
|---|---|---|
| GB | 1078098 | 8/1967 |
| JP | H06272506 A | 9/1994 |

OTHER PUBLICATIONS

Mar. 30, 2015 Search Report issued in British Patent Application No. 1419681.0.

* cited by examiner

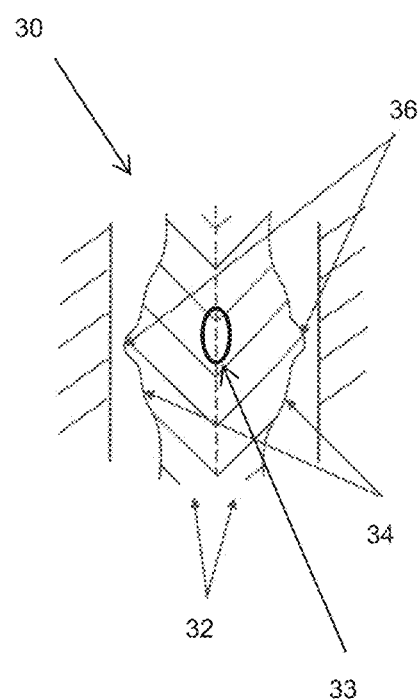
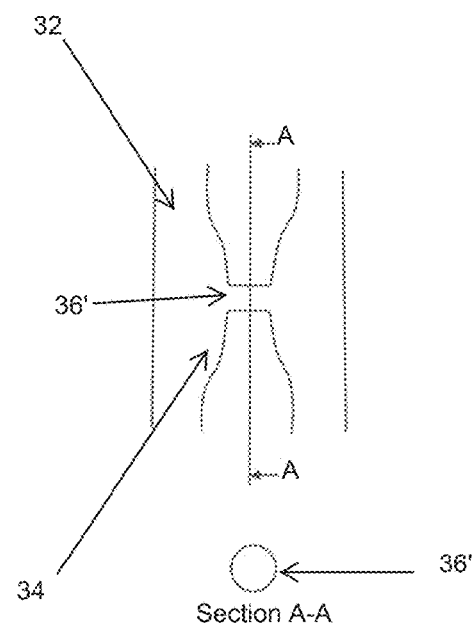
Figure 6
Figure 7

MANUFACTURING METHOD

FIELD OF THE INVENTION

The present invention relates to the manufacture of aerofoil blades, in particular but not exclusively to aerofoil blades for turbomachines such as gas turbine engines. An example of application of the present invention is to aero-mechanically optimised blisks.

BACKGROUND OF THE INVENTION

Hollow aerofoil blades are used in gas turbine engines. A typical method for manufacturing hollow aerofoil blades involves the use of diffusion bonding and superplastic forming techniques as described generally in U.S. Pat. No. 5,469,618, for example.

In a typical method, an assembly 1 is provided comprising a pair of mutually opposing panels 2 as shown in cross-section in FIG. 1A. The dashed line in FIG. 1A represents the interface between the respective panels 2. The panels 2 are typically diffusion bonded together to form an integral body.

However, a region of one or both of the faces of the panels 2, at the interface 3, is typically printed with a stop-off material such as yttria, or yttrium oxide, to prevent bonding in said region. For example, whilst the edges of assembly 1 may bond to form an integral body, a region in the centre of the assembly 1 does not bond.

The bonded assembly is arranged in a cavity die 4, and a superplastic forming process is performed to expand or inflate the assembly 1 to conform to the cavity die 4 and to form an internal hollow cavity within the assembly 1 in the unbonded region, as defined by the printed yttria.

This technique is generally known in the art.

For certain applications, it is desirable for the internal surface of the hollow aerofoil blade to include a series of ribs projecting into the internal cavity and extending generally in the direction from the leading to trailing edges of the blade. These ribs are typically incorporated in order to provide some structural rigidity to the blade and also to provide constricting elements for preventing the movement of visco-elastic damping material within the internal cavity. The visco-elastic damping material is typically injected into the internal cavity after the superplastic forming process is ended, and is present to damp vibrations within the aerofoil blade during use.

In order to form the ribs in the internal cavity of the final blade, the panels 2 are initially provided with correspondingly shaped ribs 5 on their outer surfaces, rather than on the inner surfaces which form the interface between the panels in the assembly 1. During the superplastic forming process, as the assembly is inflated, the outer surfaces of the panels 2 of assembly 1 conform to the internal structure of the cavity die. In so doing, the ribs are effectively transferred, or transposed, from the outer surfaces of the panels to the inner surfaces of the panels, and thus project into the internal cavity 6 formed between the panels during the superplastic forming process.

The resulting structure of the blade, after the superplastic forming process, is shown in FIG. 1B.

As can be seen, the internal cavity 6 is formed between the respective panels 2 which are diffusion bonded at least at their periphery, e.g. as in region 7. And ribs 5 have been transposed from the outer surfaces of the panels 2 (as shown in FIG. 1A) to the inner surfaces of panels to project into the internal cavity 6 (as shown in FIG. 1B).

Accordingly, when the visco-elastic material is located in the internal cavity 6, the ribs 5 act to restrain the material and help to prevent its movement within the internal cavity during use of the blade.

As will be appreciated, when the blade is provided on a rotor of a turbomachine, e.g. a gas turbine engine, the blade is rotated at very high angular velocities. Accordingly, the visco-elastic materials located in the internal cavity 6 are urged to creep along the internal cavity blade towards the tip of the blade. The constriction provided by mutually opposing pairs of ribs is provided to help prevent this creep.

However, it is important to regulate the size of the gap 8, or throat, between mutually opposing pairs of ribs (i.e. opposing ribs provided respectively on the panels 2). The gap 8 can be seen in FIGS. 2A and B for example.

This is because, on the one hand, if the gap 8 is too large, then the visco-elastic material is able to effectively migrate through the gap and move around within the internal cavity 6 as the blade is moved (during use), which is undesirable. The upper limit x1, as shown in FIG. 2A, of the size of the gap 8 largely can be controlled by suitable definition of the relevant dimension y of the cavity die 4.

Whereas, on the other hand, if the gap 8 is too small then it can effectively pinch off the visco-elastic material and cause fractures therein, especially when the visco-elastic material is under tension during rotation of the blade. It is difficult to control the lower limit x2 of the gap 8 by suitable definition of the dimensions of the cavity die 4. Under venting and cooling conditions it can be difficult to reliably reproduce gaps 8 having suitable lower limits x2.

In addition to the problem of pinching described above, in some circumstances, mutually opposing ribs 5 may define only a minimal gap 8, or even no gap at all. In some circumstances the ribs 5 of a mutually opposing pair of ribs may even abut against each other as shown in FIG. 2B. This is problematic because such an arrangement of the ribs will then prevent injection of the visco-elastic damping material into the entirety of the internal cavity 6 of the blade during subsequent processing, resulting in a sub-standard blade in which an insufficient amount of damping material is provided within the internal cavity.

SUMMARY OF THE INVENTION

Accordingly, the present invention proposes a method of manufacture of an aerofoil as set forth in claim 1.

The resulting aerofoil therefore includes an inner primary relief feature (which may for example be provided in the form of the rib discussed above) from which projects an inner secondary relief feature. The inner secondary relief feature is preferably arranged to act as a spacer to maintain a minimum separation between opposing inner primary relief features provided on respective skins. Therefore, the inner primary relief feature(s) are able to provide the desired structural support and also provide desirable restrictions on the creep of e.g. visco-elastic damping materials provided in the internal cavity.

For example, in conforming the outer faces of the respective skins to the cavity die mould, the outer primary relief feature is deformed and an inner primary relief feature is correspondingly formed on the inner face of the respective aerofoil skin by the deformation of the outer primary relief feature.

For example, in conforming the outer faces of the respective skins to the cavity die mould, the outer secondary relief feature is also deformed and an inner secondary relief feature is correspondingly formed on the inner primary relief feature to project therefrom by the deformation of the outer secondary relief feature.

For example, in conforming the outer faces of the respective skins to the cavity die mould, the outer primary relief feature is deformed to be smoothed out relative to the adjacent region of the respective outer face and an inner primary relief feature is correspondingly formed on the inner face of the respective aerofoil skin by the deformation of the outer primary relief feature.

For example, in conforming the outer faces of the respective skins to the cavity die mould, the secondary primary relief feature is also deformed to be smoothed out relative to the adjacent region of the respective outer face and an inner secondary relief feature is correspondingly formed on the inner primary relief feature to project therefrom by the deformation of the outer secondary relief feature.

Preferably, the inner secondary relief feature stands proud of the inner primary relief feature relative to the adjacent region of the inner surface of the respective skin. The inner secondary relief feature functions as a spacer or separator to maintain a minimum clearance between the inner primary relief feature, from which it projects, and a surface of the opposing skin.

Preferably, each skin includes a respective outer primary relief feature, for example to provide an associated pair of outer primary relief features. Preferably the associated pair of outer primary relief features are arranged opposite one another across the interface formed between the inner faces of the respective skins.

Preferably, each of the outer primary relief features, of the pair of outer primary relief features, includes a respective outer secondary primary relief feature projecting therefrom, for example to form an associated pair of outer secondary relief features. Preferably, the associated pair of outer secondary relief features are arranged opposite one another across the interface formed between the inner faces of the respective skins.

Preferably, in conforming the outer faces of the respective skins of the sub-assembly to the cavity die mould, each of the outer secondary relief features is transferred to the inner primary relief feature (which corresponds to the outer primary relief feature from which the respective outer secondary relief feature projects) to project from the inner primary relief feature into the internal cavity.

Preferably, where an associated pair of outer secondary relief feature is provided, conforming the outer faces of the respective skins to the cavity die-mould provides an associated pair of inner secondary relief features projecting into the internal cavity to be in mutual opposition.

Preferably, the associated pair of inner secondary relief features abut one another to maintain a minimum clearance between the associated pair of inner primary relief features from which they project.

Preferably, the method includes performing a bonding process before the hot forming process, wherein an interface region formed between the inner faces of the respective skins is bonded such that (in conforming the outer faces of the respective skins to the cavity die mould) the inner secondary relief features respectively formed on an associated (opposing) pair of inner primary relief features by the hot forming process are mutually bonded together to form an integral spacer body. The integral spacer body maintains a minimum clearance between the associated pair of inner primary relief features from which they project. The integral spacer body may maintain a maximum clearance between the associated pair of inner primary relief features from which they project. The integral spacer body preferably maintains a fixed (constant) clearance between the associated pair of inner primary relief features from which they project.

Preferably, the outer primary relief feature is an elongate feature which extends along the outer face of the respective skin. Therefore, the inner primary relief feature is formed to be a correspondingly elongate feature extending along the inner face of the respective skin.

Preferably, a plurality of discrete outer secondary relief features is provided mutually spaced apart on each outer primary relief feature, for example in a series along the length of the respective elongate outer primary relief feature.

The aerofoil is preferably a fan blade for a gas turbine engine.

According to another aspect, the present invention provides an aerofoil blade having a pair of aerofoil skins mutually cooperating to define an internal cavity of the aerofoil, the aerofoil blade including: on an inner face of each skin defining the internal cavity a respective rib extending along the surface of the respective skin and projecting into the cavity to form a pair of ribs with the respective other rib formed on the inner face of the respective other skin; and at least one spacer element provided on at least one of the ribs, and arranged on the rib to maintain a minimum clearance between the respective ribs.

Each rib is preferably provided with at least one spacer element, spacer elements on the respective ribs being mutually engageable to maintain a minimum clearance between the respective ribs.

Each rib is preferably provided with plurality of mutually spaced apart spacer elements arranged in series along its length, pairs of spacer elements formed of a spacer element from each of the respective ribs being mutually engageable to maintain a minimum clearance between the respective ribs.

A plurality of mutually spaced apart spacer elements are preferably provided for each rib, and wherein each spacer element is provided as a connecting body integrally formed with each rib of said pair of ribs, thereby to maintain a predetermined clearance between the respective ribs.

BRIEF DESCRIPTION OF THE DRAWINGS

Embodiments of the invention will now be described by way of example with reference to the accompanying drawings in which:

FIG. 6 shows a cross-section of an aerofoil blade assembly arranged in a cavity die prior to the hot forming process in accordance with yet another embodiment of the present invention;

FIG. 7 shows a cross-section of a hollow aerofoil blade after the hot forming process, in which the inner secondary relief features form an integral body between the respective ribs to maintain a minimum clearance between the ribs in accordance with yet another embodiment of the present invention.

DETAILED DESCRIPTION AND FURTHER OPTIONAL FEATURES OF THE INVENTION

Figures 1A, 1B:
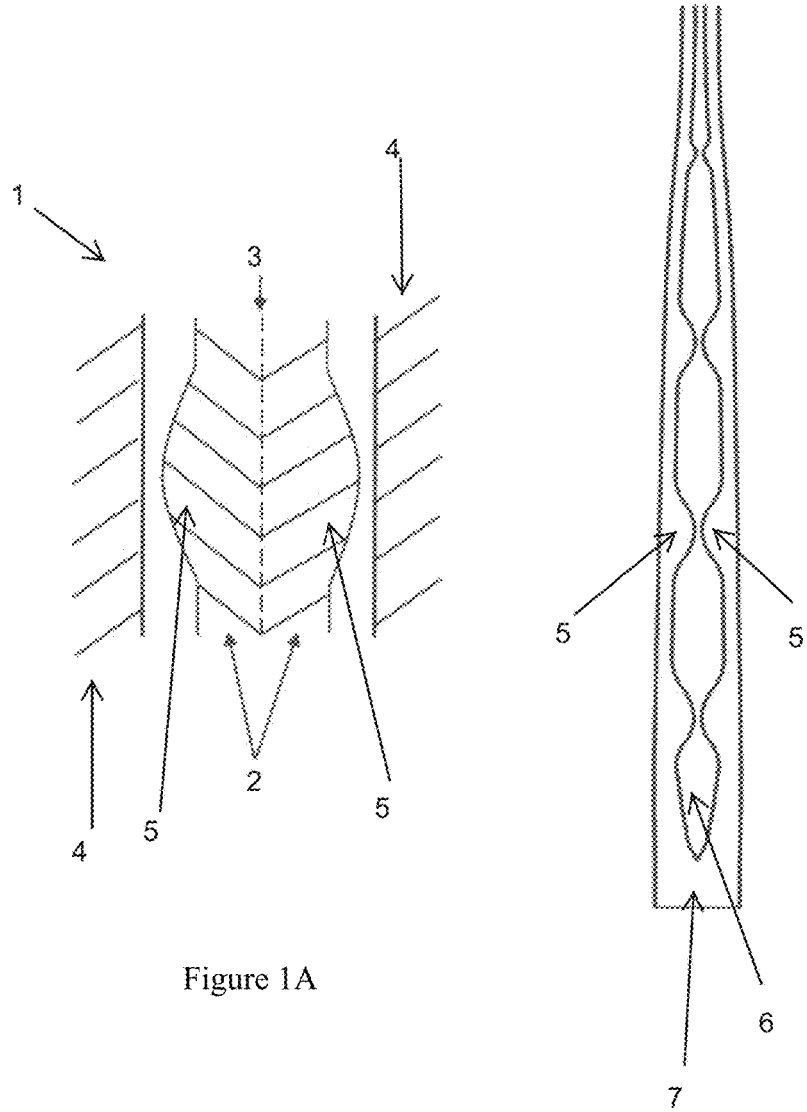
FIG. 1A shows a cross-section of a prior art aerofoil blade assembly arranged in a cavity die prior to the hot forming process.
FIG. 1B shows a cross-section of a prior art hollow aerofoil blade after the hot forming process.
Figures 2A, 2B:
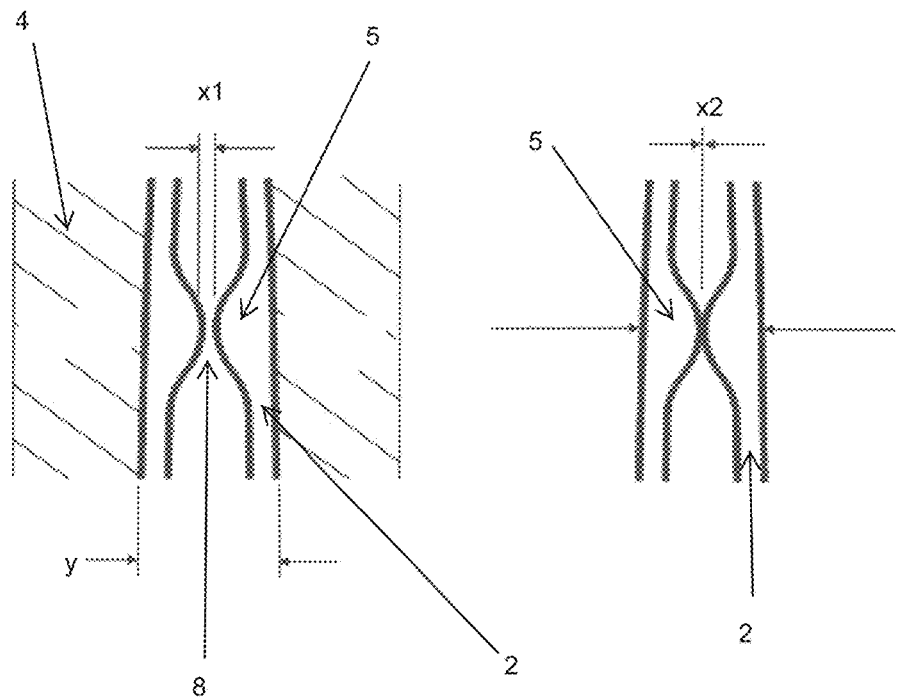
FIG. 2A shows a cross-section of a prior art aerofoil blade assembly arranged in a cavity die.
FIG. 2B shows a cross-section of a prior art hollow aerofoil blade.
Figure 3:
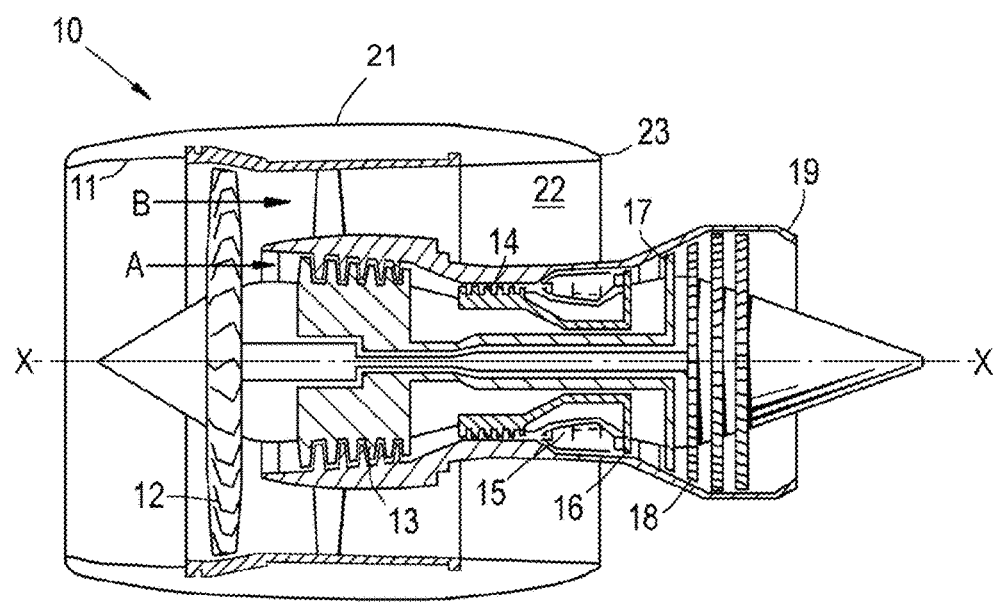
FIG. 3 shows a cross-section of a gas turbine engine in which the present invention is able to be incorporated.

With reference to FIG. 3, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

In an aspect, the present invention relates to aerofoil blades for such gas turbine engines. For example, in an aspect the present invention provides a method of manufacture of an aerofoil blade for such gas turbine engines. The aerofoil blade may be a fan blade, for example. The blade may be ultimately be incorporated into a blisk for example.

In an embodiment of the present invention, an assembly 30 is provided comprising of a pair of mutually opposing panels or skins 32. This is shown in cross-section in FIG. 4A, where the dotted (dashed) line indicates the interface between the inner faces of the skins 32.

The skins 32 are bonded together, e.g. by diffusion bonding, to form an integral body. However, a region of one or both of the inner faces at the interface of the skins 32 is typically coated, e.g. printed, with a stop-off material to prevent bonding between the skins 32 in the coated region. The region to remain unbonded is typically the central region of the assembly 30. The periphery around the central region is preferably bonded. So, whilst the periphery of assembly 30 may bond to form the integral body, a region in the centre of the assembly 30 does not bond and an interface remains between the inner faces of the respective skins 32.

The stop-off material may be yttria for example.

Figure 4:
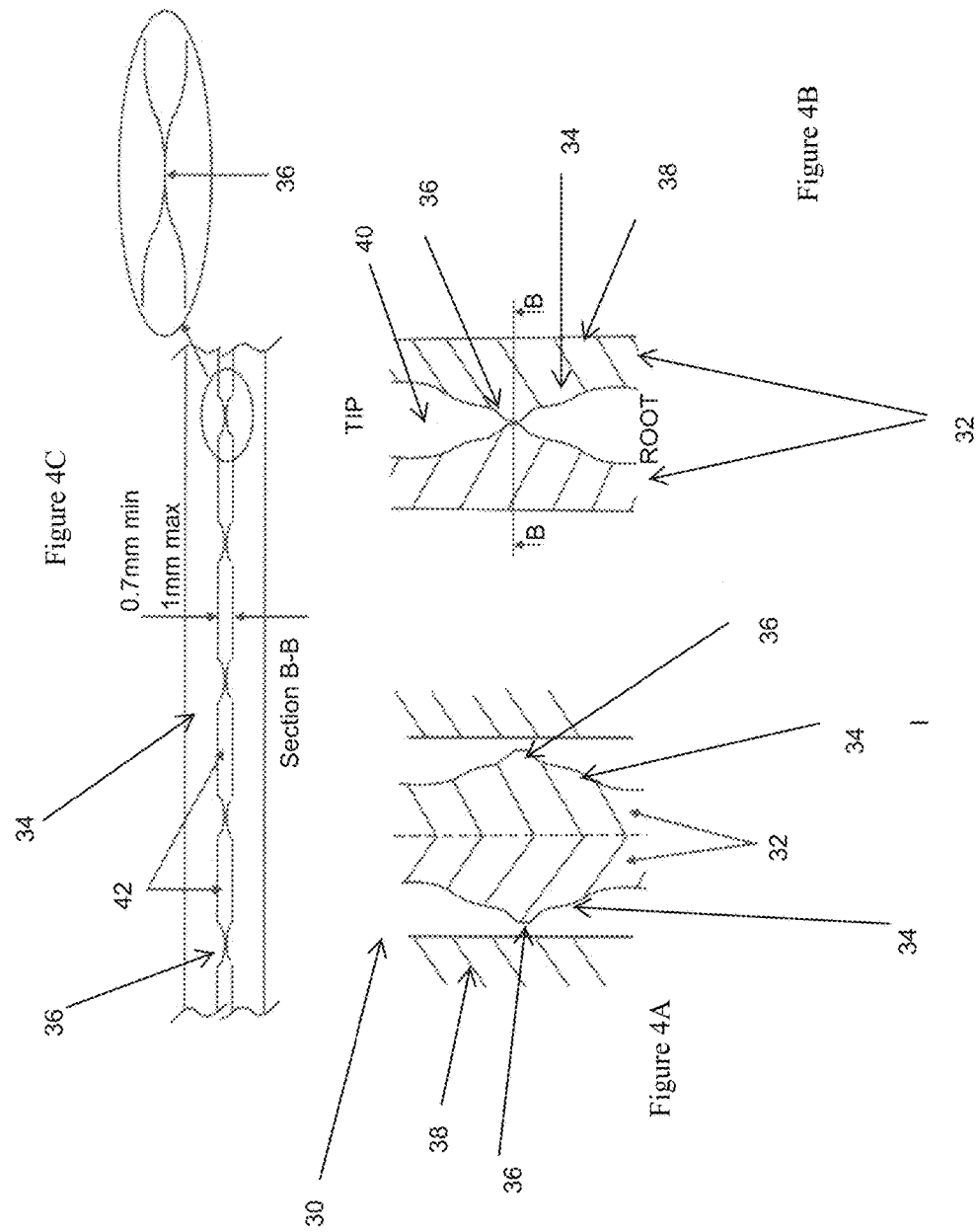
FIG. 4A shows a cross-section of an aerofoil blade assembly arranged in a cavity die prior to the hot forming process in accordance with an embodiment of the present invention.
FIG. 4B shows a cross-section of a hollow aerofoil blade after the hot forming process is applied to the assembly shown in FIG. 4A, in which the inner secondary relief features abut one another to maintain a minimum clearance between the ribs in accordance with an embodiment of the present invention.
FIG. 4C shows a cross-section B-B of the aerofoil represented in FIG. 4B, and shows a series of pairs of mutually engaging inner secondary relief features maintaining a minimum clearance between a pair of mutually opposing ribs in accordance with an embodiment of the present invention.

In an embodiment, each respective skin is provided with one or more elongate ribs 34 on its outer surface, e.g. as shown in FIG. 4A. The elongate ribs 34 project from the outer surface of the respective skin 32. The elongate ribs extend along the outer surface of the skins 32. Typically, the ribs 34 extend generally between regions of the assembly 30 which will ultimately provide the leading and trailing edges of the aerofoil blade.

Preferably, a rib 34 on a first skin 32 of the pair of skins is associated with another rib 34 on the (respective other) second skin 32 of the pair of skins, thereby forming an associated pair of ribs. The associated pair of ribs project from their respective skins in mutually opposing directions, e.g. across the interface of the inner faces of the respective skins 32. The pair of ribs of the associated pair of ribs may mirror each other across the interface.

Each rib 34 preferably has one or more relief features 36 formed thereon, as shown in FIG. 4A. Preferably each relief feature 36 stands proud of the rib 34 on which it is formed. Preferably each relief feature 36 stands proud of the rib 34 on which it is formed relative to the surrounding outer face (surface) of the skin 32. For example, the or each relief feature 36 may be formed at the apex of the rib 34, when viewed in cross-section.

Where a plurality of relief features 36 is provided on a rib 34, the relief features may be mutually spaced apart in a series running along at least a portion of the length of the (elongate) rib 34. The spacing between respective pairs of adjacent relief features in the series may be identical.

According to the method the assembly is preferably arranged in a cavity die mould 38, and is subject to a hot forming process. The hot forming process conforms the outer faces of the skins forming the (integral) assembly 30 to the internal shape (dimensions) of a cavity die 38. The hot forming process preferably includes a step of superplastic forming. The skilled person is aware of suitable temperatures, pressures and processing times for the hot forming process.

During the hot forming step (e.g. a superplastic forming step) to conform the assembly to the cavity die, the assembly may be inflated to form an internal cavity with the assembly 30 defined by the unbonded inner surfaces previously forming the interface between the skins 32.

The effect of conforming the outer faces of the skins can be seen by comparing FIGS. 4A and 4B. In FIG. 4A the non-conformed assembly 30 is located in the cavity die 38, and there is clear space (i.e. a void) between the portions of the assembly 30 and the die 38, for example between the rib 34, relief feature 36 and the die 38.

Whereas, in FIG. 4B the outer faces of the skins 32 have conformed to the shape of the internal surfaces (dimensions) of the cavity die 38 as a result of the hot forming process. In so doing, the skins 32 are mutually separated and re-shaped to conform to the shape of the cavity die, and consequently the assembly 30 has formed within it an internal cavity 40, defined between the re-shaped skins 32.

Furthermore, as a result of the hot forming process the ribs 34 and the relief features 36 which were originally provided on the outer faces of the skins 32 are effectively transferred or transposed to the inner surfaces of the skins 32 by the re-shaping of the skins 32 to confirm to the cavity die 38.

The features which were originally provided on the outer faces of the skins 32 have in effect been "pushed through" the skins so as to be provided on the inner faces of the skins 32, and so as to project into the cavity 40.

By suitable selection of the size, location and form of the ribs 34 and relief feature(s) 36 on the outer surface of the skins 32, the size, location and form of the ribs 34 and relief feature(s) 36 generated on the inner surfaces of the skins 32 can be predicted with suitable accuracy and reliability.

So, for example, where the relief feature(s) 36 provided on the ribs 34 stand proud on the ribs 34 relative to the surrounding area of the outer face of the respective skin 32, the corresponding relief feature(s) 36 formed on the ribs 34 projecting into the internal cavity 40 after the hot forming process correspondingly stand proud on the ribs 34 relative to the surrounding area of the inner face of the respective skin 32.

In general terms, the process can be thought of as transferring or transposing the ribs and relief features from the outer faces of the skins to the inner faces of the skins.

In certain embodiments, a pair of associated bosses or nipples is provided as relief features respectively on the ribs of an associated pair of ribs 36 formed on the outer surfaces of the respective skins 32.

As a consequence, following the hot forming process to conform the assembly to the cavity die 38, the associated pair of ribs are transferred to the inner faces of the respective skins 32 to be in mutual opposition across the cavity formed in the assembly 30 (in other words to project towards one another across the cavity 40); and the bosses 36 of the associated pair of bosses are also transferred to be in mutual opposition across the cavity formed in the assembly 30 (in other words to project towards one another across the cavity 40). This can be seen with reference to FIG. 4B for example.

Accordingly, the transferred bosses of an associated pair of bosses can mutually cooperate to act as spacers to maintain a minimum clearance between the respective (transferred) ribs from which they project. This is shown in FIG. 4B, where the transferred bosses 36 maintain a minimum clearance between the transferred ribs 34.

Where desirable, the transferred bosses 36 (transferred relief features) may be formed to abut one another in the final aerofoil blade to maintain the clearance between the ribs as shown figuratively in FIG. 4B.

Figure 5:
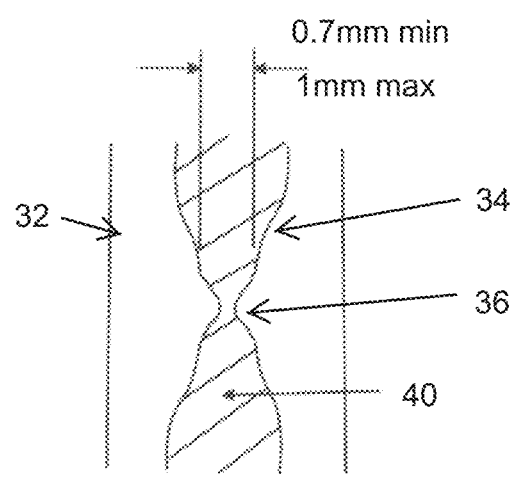
FIG. 5 shows a cross-section of an alternative hollow aerofoil blade after the hot forming process in accordance with another embodiment of the present invention, in which the inner secondary relief features do not typically abut one another.

Alternatively, the transferred bosses 36 (transferred relief features) may be arranged so as not to abut one another in the final aerofoil blade, as shown in FIG. 5 for example, unless the blade is subject to stresses which cause temporary deformation of the blade bringing the respective bosses 36 into abutment. This might occur, for example, during the intended use of the blade, e.g. as a fan blade in a gas turbine engine. In this case, the transferred relief features (bosses) may temporarily abut one another to maintain a minimum clearance between the respective ribs from which they project.

In any event, the transferred relief features 36, e.g. the transferred bosses 36, of an associated pair of transferred relief features cooperate to maintain (even to define) a minimum (achievable) clearance between the respective associated pair of ribs, thereby ensuring that the ribs of an associated pair of ribs do not approach one another sufficiently to pinch off any visco-elastic material (located in the internal cavity of the aerofoil blade) during use of the aerofoil blade.

Furthermore, maintaining a minimum clearance between the ribs also ensures that during the step of injecting a fluid, e.g. a visco-elastic damping material, into the internal cavity, the fluid is able to be injected into all desirable regions of the internal cavity. This is demonstrated with reference to FIG. 4C, which shows a cross-section of an associated pair of ribs, each having a respective series of mutually spaced apart relief features formed thereon. The relief features of the respective series are arranged to be in mutual opposition across the cavity thereby forming associated pairs of relief features.

The associated pairs of relief features 36 cooperate to maintain channels or throats 42, to permit the fluid to be injected therethrough. As is indicated in FIG. 4C it is preferred that the channel has a minimum height (the distance between the respective ribs in an associated pair of ribs) of no less than 0.7 mm, and the relief features are therefore, shaped, sized and located suitably. For example, each relief feature 36 may project from the rib to a height of e.g. 0.35 mm.

In certain applications it is also desirable to define a maximum clearance between the ribs, for example to prevent creep of the damping material, as previously discussed. Embodiments of the present invention can therefore provide a means to restrict the clearance between the ribs to a well-defined predetermined maximum. Indeed, the clearance can be pre-defined to be substantially invariant in use when the aerofoil blade is maintained at a constant temperature and pressure.

For example, this is achievable by diffusion bonding additional portions 33 of the interface between the skins 32 in the regions where the relief features are expected to transfer during the hot forming process.

It can be reliably (and easily) determined by the skilled person which regions of the inner faces of the skins 32 will be formed into the inner (secondary) relief features by transfer of the outer (secondary) relief features during the hot forming process. Thus, the additional region to be bonded 33, to ensure that the respective inner secondary relief features of a pair of inner secondary relief features bond together, can be easily and reliably identified. For example, the skilled person is able to identify the region indicated by the oval shape overlaid on the interface (represented as the dashed line again) in FIG. 6 (i.e. the oval labelled with reference numeral 33).

Accordingly, by allowing this region to bond, when the outer relief features are transferred form the outer faces of the skins to the inner faces of the skins, the transferred relief features forming an associated pair of transferred relief features cooperate to form an integral body connecting the respective skins 32 together.

The integral connecting body 36' may be in the form of a post for example, in particular a generally cylindrical post as shown in FIG. 7.

To put it another way, to achieve this result at least a portion of the region 33 of the interface between the skins which is located between the respective relief features of an associated pair of relief features is bonded, e.g. diffusion bonded, to join the skins together. Thus, when the relief features are transferred to the inner faces of the respective skins, the bonded region results in an integral connecting body 36' (effectively comprising a bonded associated pair of transferred relief features 36) extending between the respective skins 32, in particular between primary relief features such as the ribs 34.

The relief features are otherwise provided as for the other embodiments described herein, for example to project from e.g. ribs formed on the outer faces of the skins 32 prior to the hot forming step.

Indeed, other than the bonding of the additional region or regions 33 of the interface between the skins to result in the integral connecting body or bodies after the hot forming step, the present embodiment is largely the same as the other embodiments described herein. However, advantageously, the present embodiment provides a well-defined maximum clearance between the transferred ribs in addition to a well-defined minimum clearance.

Accordingly, where the respective series of relief features are provided on associated pairs of ribs 34, additional bonding regions 33 are formed between the respective relief features of associated pairs of relief features and are bonded during the bonding step, thereby providing a series of integral connecting bodies 36' provided along the length of an associated pair of ribs 34, similar to that shown in FIG. 4C for the abutting inner relief features 36.

The cross-sectional form (looking along the long axis) of the integral connecting body is largely defined by the shape of the additional bonded region formed between the associated pair of relief features. A square bonded region would likely result in an integral connecting body which is generally square in cross-section, albeit that the hot forming step may result in some rounding of the corners for example.

It is preferred that the integral connecting body is circular, oval, or otherwise rounded in cross-section as shown in FIG. 7, especially where the final aerofoil is likely to be filled with visco-elastic damping. Such rounded structures are less likely to cause tears or fissures in the visco-elastic damping material.

The invention claimed is:

1. A method of manufacture of an aerofoil blade, the method comprising steps of:
    providing an aerofoil sub-assembly having a first aerofoil skin and a second aerofoil skin, each of the first aerofoil skin and the second aerofoil skin having an inner face arranged in mutual opposition with the inner face of the respective other skin, and each of the first aerofoil skin and the second aerofoil skin having an outer face on the opposite side of the respective aerofoil skin to the inner face, at least the first aerofoil skin including: (i) an outer primary relief feature formed on and protruding outward from the outer face of the first aerofoil skin, and (ii) an outer secondary relief feature formed on an apex of the outer primary relief feature and protruding outward from the outer primary relief feature;
    arranging the aerofoil sub-assembly in a cavity die mould; and
    performing a hot forming process to form an internal cavity between the respective first aerofoil skin and the second aerofoil skin by inflating the sub-assembly to conform the outer faces of the respective first aerofoil skin and the second aerofoil skin to the cavity die mould, whereby in conforming the respective outer faces of the first aerofoil skin and the second aerofoil skin to the cavity die mould:
        the outer primary relief feature is transferred to the inner face of the first aerofoil skin to form an inner primary relief feature, the inner primary relief feature protruding inward from the inner face of the first aerofoil skin to project into the internal cavity towards the inner face of the second aerofoil skin, and
        the outer secondary relief feature is transferred to inside the internal cavity and formed on the inner primary relief feature to project inward as an inner secondary relief feature, the inner secondary relief feature formed on and protruding inward from an apex of the inner primary relief feature and contacting the inner face of the second aerofoil skin.

2. The method of manufacture of an aerofoil blade according to claim 1, wherein in conforming the outer faces of the first aerofoil skin and the second aerofoil skin to the cavity die mould, the outer primary relief feature is deformed and the inner primary relief feature is correspondingly formed on the inner face of the first aerofoil skin by the deformation of the outer primary relief feature.

3. The method of manufacture of an aerofoil blade according to claim 1, wherein in conforming the outer skins of the first aerofoil skin and the second aerofoil skin to the cavity die mould, the outer secondary relief feature is deformed and the inner secondary relief feature is correspondingly formed on the inner primary relief feature to project therefrom by the deformation of the outer secondary relief feature.

4. The method of manufacture of an aerofoil blade according to claim 1, wherein in conforming the outer skins of the first aerofoil skin and the second aerofoil skin to the cavity die mould, the outer primary relief feature is deformed to be smoothed out relative to an adjacent region of the outer face of at least the first aerofoil skin and the inner primary relief feature is correspondingly formed on the inner face of the the first aerofoil skin by the deformation of the outer primary relief feature.

5. The method of manufacture of an aerofoil blade according to claim 4, wherein in conforming the outer skins of the first aerofoil skin and the second aerofoil skin to the cavity die mould, the outer secondary primary relief feature is deformed to be smoothed out relative to the adjacent region of the outer face of at least the first aerofoil skin and the inner secondary relief feature is correspondingly formed on the inner primary relief feature to project therefrom by the deformation of the outer secondary relief feature.

6. The method of manufacture of an aerofoil blade according to claim 1, wherein the inner secondary relief feature protrudes outward from the inner primary relief feature relative to an adjacent region of the inner surface of at least the first aerofoil skin.

7. The method of manufacture of an aerofoil blade according to claim 1, wherein the second aerofoil skin includes an outer primary relief feature arranged opposite to the outer primary relief feature of the first aerofoil skin.

8. The method of manufacture of an aerofoil blade according to claim 7, wherein:
    the outer primary relief feature of the second aerofoil skin includes an outer secondary primary relief feature projecting therefrom; and
    in conforming the respective outer faces of the first aerofoil skin and the second aerofoil skin of the sub-assembly to the cavity die mould, each of the outer secondary relief features of the first aerofoil skin and the second aerofoil skin is transferred to the inner primary relief feature, which corresponds to the outer primary relief feature from which the respective outer secondary relief feature projects, to project from the inner primary relief feature into the internal cavity.

9. The method of manufacture of an aerofoil blade according to claim 8, wherein the inner secondary relief features of the first aerofoil skin and the second aerofoil skin are formed on the opposing inner primary relief features that abut one another.

10. The method of manufacture of an aerofoil blade according to claim 9, further comprising the step of performing a bonding process before the hot forming process, in the bonding process an interface region between the respective inner faces of the first aerofoil skin and the second aerofoil skin are bonded such that the inner secondary relief features respectively formed on the opposing inner primary relief features by the hot forming process are mutually bonded together.

11. The method of manufacture of an aerofoil blade according to claim 1, wherein the outer primary relief feature is elongate, and the inner primary relief feature formed by the hot forming process is correspondingly elongate.

12. The method of manufacture of an aerofoil blade according to claim 11, further comprising a plurality of discrete outer secondary relief features provided in series along a length of the elongate outer primary relief feature to be mutually spaced apart.

13. The method of manufacture of an aerofoil blade according to claim 1, wherein the aerofoil blade is a fan blade for a gas turbine engine.

14. An aerofoil blade comprising:
 a first aerofoil skin and a second aerofoil skin mutually cooperating to define an internal cavity of the aerofoil blade, each of the first aerofoil skin and the second aerofoil skin having an inner face defining the internal cavity;
 a rib extending along the inner face of each of the first aerofoil skin and the second aerofoil skin, each rib projecting into the internal cavity to form a pair of ribs opposing each other; and
 at least one spacer element provided on an apex of at least one rib of the pair of ribs, the at least one spacer element protruding inward towards the other one of the pair of ribs and arranged on the at least one rib to maintain a minimum clearance between the respective ribs by contacting a second spacer element.

15. The aerofoil blade according to claim 14, wherein each rib of the pair of ribs is provided with at least one spacer element, spacer elements on the respective ribs being mutually engageable to maintain the minimum clearance between the pair of ribs.

16. The aerofoil blade according to claim 15, wherein each rib is provided with plurality of mutually spaced apart spacer elements arranged in series along a length of each rib of the pair of ribs, pairs of spacer elements of the plurality of spacer elements being formed of a spacer element from each of the respective ribs that are mutually engageable to maintain the minimum clearance between the respective ribs.

17. The aerofoil blade according to claim 14, wherein a plurality of mutually spaced apart spacer elements are provided on each rib, and wherein each spacer element of the plurality of spacer elements is provided as a connecting body integrally formed with each rib of the pair of ribs, thereby to maintain the predetermined clearance between the respective ribs.

* * * * *